Oct. 25, 1966  R. G. AMES  3,280,663
EMBOSSING TOOL FOR FORMING GROOVE IN OUTER FACE AND TAPERED
PORTION ON INNER FACE OF WALLBOARD
Filed April 9, 1964  2 Sheets-Sheet 1
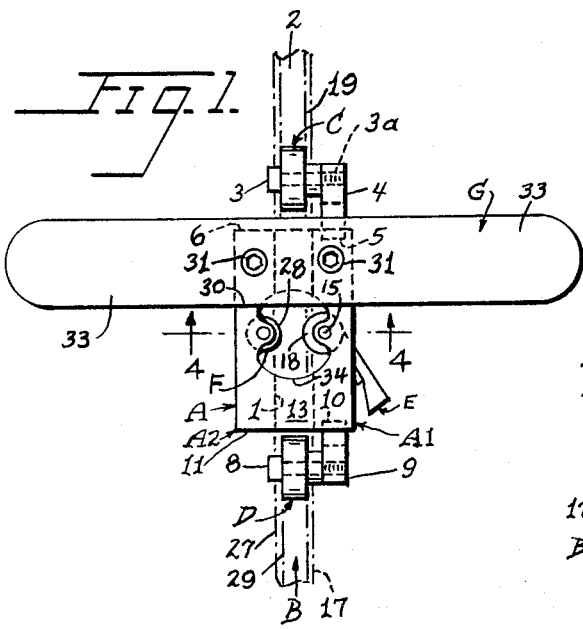
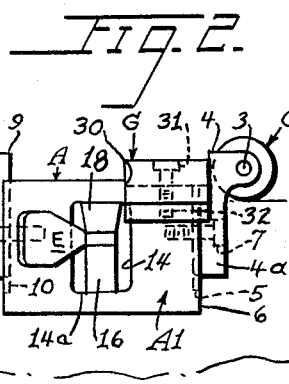
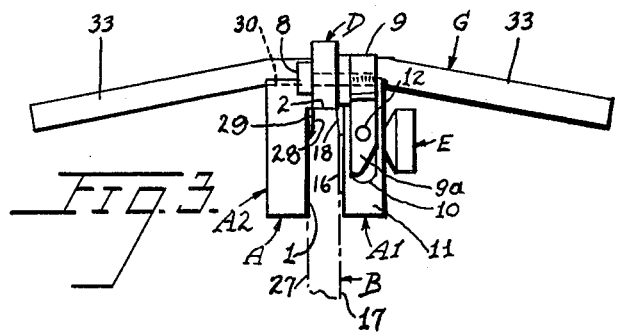
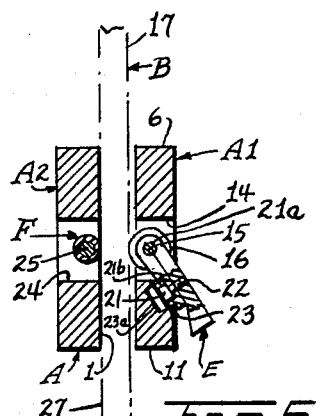
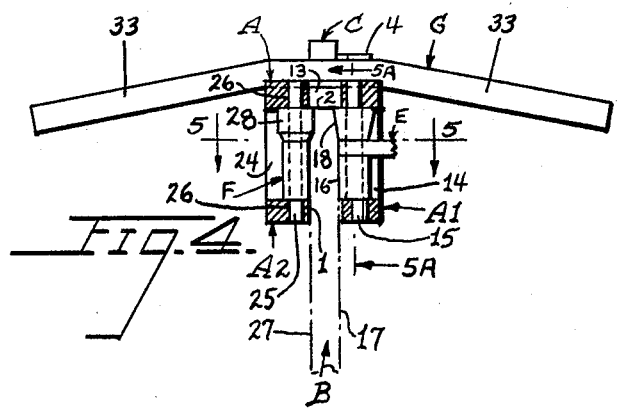
INVENTOR
ROBERT G. AMES
BY William R. Piper
ATTORNEY Oct. 25, 1966 R. G. AMES 3,280,663
EMBOSSING TOOL FOR FORMING GROOVE IN OUTER FACE AND TAPERED
PORTION ON INNER FACE OF WALLBOARD
Filed April 9, 1964 2 Sheets-Sheet 2
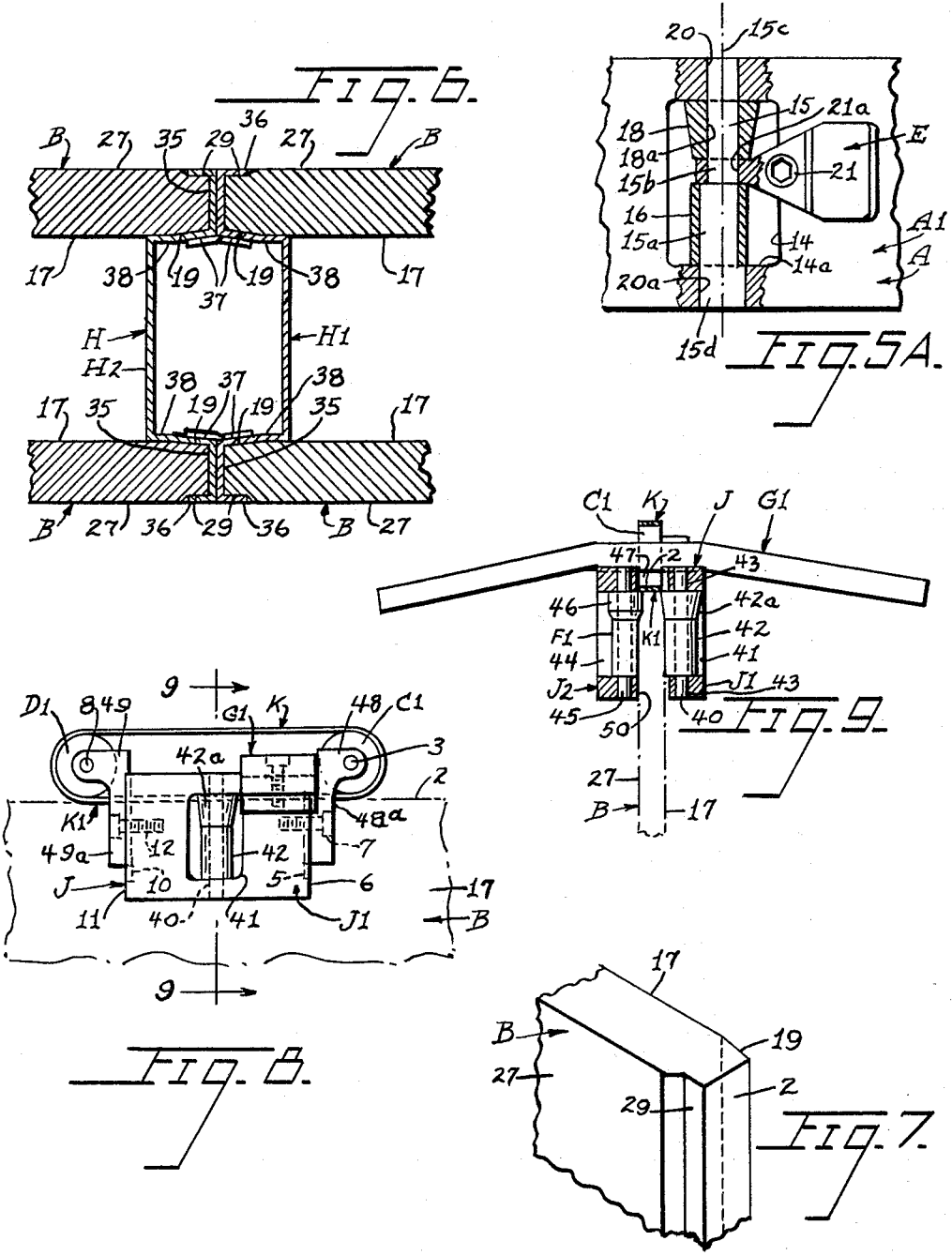
INVENTOR
ROBERT G. AMES
BY William R. Piper
ATTORNEY

United States Patent Office 3,280,663
Patented Oct. 25, 1966

3,280,663
EMBOSSING TOOL FOR FORMING GROOVE IN OUTER FACE AND TAPERED PORTION ON INNER FACE OF WALLBOARD
Robert G. Ames, Hillsborough, Calif., assignor to Ames Taping Tool Systems Manufacturing Co., Harvey, Ill., a corporation of Illinois
Filed Apr. 9, 1964, Ser. No. 358,490
8 Claims. (Cl. 81—3)

The present invention relates to improvements in an embossing tool for forming groove in outer face and tapered portion on inner face of wallboard, and it consists in the combination, construction and arrangement of parts as hereinafter described and claimed.

An object of my invention is to provide an embossing tool for forming a groove in the outer face of a wallboard and adjacent to an edge of the board. At the same time the tool forms a tapered portion or inclined surface on the inner wallboard face and adjacent to the same edge. The embossing tool is hand operated and is designed to form both the groove and the inclined surface on opposite faces of the wallboard and adjacent to the same edge so that this edge can be inserted into a channel of a metal stud.

In my copending application on a metal stud, Serial No. 292,996, filed July 5, 1963, I disclose a channel for receiving an edge of a piece of wallboard. This channel has an outer flange that is designed so that it may be received in a groove formed in the outer face of the wallboard. The channel also has an inner flange paralleling the outer one and having an inclined portion that frictionally engages with the inclined surface formed on the inner face of the board so as to force the board outwardly as the board edge is moved into the channel. This will cause the outer board surface to be brought into a flush position with the outer surface of the outer flange. In this way the wall will have a uniform flat outer surface composed of the outer surface of the wallboard section and the outer surface of the metal stud outer flange.

If the wallboard edge is of less thickness than that required, I disclose and claim in a companion case an embossing tool for increasing the edge thickness of wallboard, Serial No. 358,491, filed April 9, 1964, and this is accomplished by the tool embossing a groove in the edge of the board for increasing the thickness of the edge while at the same time preventing the edge from being increased beyond a predetermined thickness.

A further object of my invention is to provide an embossing tool of the type described that will form a groove in the outer wallboard surface and adjacent to an edge of the board that will receive the outer flange in the board-receiving channel of the metal stud. When the flange is received in the board groove, the depth of the groove will cause the outer surface of the board to lie flush with the outer surface of the flange. Some wallboards are provided with a groove in the outer surface of the board and adjacent to an edge that is to be received in the metal stud channel. In this event, my embossing tool would not form such a groove in the wallboard.

Present wallboard thicknesses of commercial wallboard sections range from about one-fourth of an inch (¼") up to one inch (1") thickness. Greater quantities of wallboards are made in the one-half inch (½") thickness size than any other thickness. My embossing tool can be made to emboss wallboards of any desired thickness.

In a modified form of my embossing tool, I show non-adjustable rollers for forming the groove in the outer wallboard surface and for forming the inclined surface portion on the inner surface of the board. In the same modified form of tool I further disclose a flexible steel band endless tread or runner that is passed around both the front and rear wheels carried by the tool body. This band or runner rides on the edge of the wallboard, adjacent to which is being formed the groove in the outer board surface and the inclined portion on the inner board surface.

The embossing tool is simple in construction and is durable and efficient for the purpose intended.

Other objects and advantages will appear as the specification continues. The novel features of the invention will be set forth in the appended claims.

Drawings:

For a better understanding of my invention, reference should be made to the accompanying drawings, forming part of this specification, in which:

FIGURE 1 is a top plan view of the embossing tool and is shown about one-half size.

FIGURE 2 is a side elevation of the embossing tool when looking at the right hand side of FIGURE 1.

FIGURE 3 is a rear elevation of the device.

FIGURE 4 is a transverse verticle section taken along the line 4—4 of FIG. 1.

FIGURE 5 is a horizontal section taken along the line 5—5 of FIGURE 4.

FIGURE 5A is a vertical section on a larger scale and is taken along the line 5A—5A of FIGURE 4.

FIGURE 6 is a horizontal section through a metal stud of the type shown in my copending application, Serial No. 292,996, filed July 5, 1963. The metal stud and the four portions of the wallboards are illustrated full size.

FIGURE 7 is an isometric view of a portion of a wallboard showing the board provided with a groove in its outer face and an inclined portion on its inner face.

FIGURE 8 is a side elevation of a modified form of the embossing tool.

FIGURE 9 is a transverse section taken along the line 9—9 of FIGURE 8.

While I have shown only the preferred forms of my invention, it should be understood that various changes, or modifications, may be made within the scope of the annexed claims without departing from the spirit thereof.

Detailed description

In carrying out my invention, I provide an embossing tool that has a body A which is in the shape of an inverted U, see the rear elevation in FIGURE 3 of the tool. The body A has two sides A1 and A2 and these sides are spaced from each other and are arranged parallel with respect to each other. A slot 1 is provided between the parallel sides A1 and A2 and this slot is designed to receive the edge 2 of a sheet of wallboard B shown in FIGURE 7. The edge 2 of the wallboard is also shown by dot-dash lines in FIGURE 2 and it will be seen that wheels C and D ride on the edge 2.

The wheel C is rotatably mounted on the shank of a cap screw 3, see FIGURE 1. This cap screw has a threaded portion 3a that is received in a threaded bore provided in a bracket 4. FIGURE 2 shows the bracket as being L-shaped and the base 4a of the bracket is adjustably received in a groove 5 provided in the front end 6 of the body A. A cap screw 7 secures the bracket 4 to the body A, see FIGURE 2.

The rear wheel D is rotatably mounted on a cap screw 8, see FIGURE 1 and this cap screw has a threaded portion that is received in a bracket 9. FIGURE 2 shows the bracket 9 as being L-shaped and as having a base 9a that is received in a groove 10 formed in the rear end 11 of the body A. A cap screw 12 secures the rear bracket 9 to the body A.

The front and rear wheels C and D ride on the edge 2 of the wallboard B and space the interconnecting web 13 that connects the sides A1 and A2 together a slight distance away from the edge 2 of the wallboard. This reduces the friction when using the tool for embossing the wallboard in a manner hereinafter described. A simpler form of the invention could do away with the front and rear wheels C and D and their supporting brackets 4 and 9 and permit the interconnecting web 13 of the body A to directly contact with the edge 2 of the wallboard. The tool in use would have its interconnecting web 13 slide along the edge 2.

Such a structure would increase the friction when using the embossing tool and the operator would have to exert a greater effort to emboss the wallboard. I have found that the use of the front and rear wheels C and D will make the operation of the tool much more easy and will cause less mutilation to the edge 2 of the wallboard.

The body A is provided with two rollers that contact with opposite sides of the wallboard B, see FIGURE 4. The side A1 of the body A has an opening 14, see FIGURES 2 and 5A. A shaft 15 extends vertically through the opening 14 and it has a cylindrical eccentric portion 15a that extends throughout a portion of the length of the shaft. In FIGURES 4 and 5A, the lower end of the cylindrical eccentric portion 15a is shown terminating above the lower end of the shaft 15 and this lower end lies in the same plane as the horizontal portion 14a of the lower edge of the opening 14. A sleeve roller 16 is rotatably mounted on the cylindrical eccentric portion 15a of the shaft 15. This sleeve roller has its lower end contacting with the lower edge 14a of the opening 14. A handle E is secured to the portion 15b of the shaft 15 that is disposed immediately above the eccentric portion 15a. The cylindrical portion 15b is concentric with the axis 15c of the shaft and is received in a vertical bore 20 provided in the portion of the side A1 that lies above the opening 14, see FIGURE 5A. The cylindrical portion of the shaft 15d lying directly below the eccentric 15a is of a larger diameter than the eccentric 15a and it is concentric with the shaft axis 15c. A conical roller 18 having a bore 18a is mounted on the upper shaft portion 15b and directly above the lever E. The length of the conical roller 18 is less than the length of the sleeve roller 16.

In assembling the shaft 15 and the sleeve roller 16, the lever E and the conical roller 18 in the opening 14 in the side A1, the smaller diameter portion 15b is first inserted through the larger bore 20a provided in the side A1 and below the opening 14. Before the top of the portion 15b is inserted into the bore 20 that is aligned with the bore 20a, the sleeve roller 16 is inserted into the opening 14 so that its axis parallels the shaft axis 15c. The shaft portion 15b is moved upwardly through the sleeve roller and the latter is moved down upon the eccentric portion 15a of the shaft. The inner diameter of the sleeve roller is the same as the outer diameter of the eccentric portion 15a.

Next, the lever E has the bore 21a, see FIGURE 5A, receiving the shaft portion 15b and then the conical roller 18 is mounted on the shaft portion 15b, after which this shaft portion is moved into the upper bore 20 in the side A1. The lower and larger cylindrical portion 15d of the shaft 15 will be received in the larger lower bore 20a of the side A1. FIGURES 1, 2, 3 and 5 show the handle E when in operative position so as to rotate the eccentric cylindrical portion 15a of the shaft 15 and cause the sleeve roller 16 to project into the space 1 provided between the sides A1 and A2 for a purpose presently described. The sleeve roller 16 will ride, adjustably on the inner face 17 of the wallboard B, see FIGURE 4.

In FIGURE 5, I show the handle E split from the bore 21a that receives the shaft portion 15b. A set screw 21 is received in a shouldered bore 21b in the lever and the threaded end of the set screw is received in a threaded bore 22 in the lever. The side A1 of the body A has a recessed portion 23 for receiving the lever when it is swung into operative position. The recessed portion 23 has an indentation 23a for receiving the head of the set screw 21 when the lever is swung into operative position. The split in the lever or handle E from the bore 21a permits the lever to be gripped to the shaft portion 15b when the set screw 21 is tightened. The lever when secured to the shaft 15, prevents the latter from falling out from the aligned bores 20 and 20a. FIGURE 5A shows the lever E in inoperative position and the eccentric portion 15a of the shaft will be positioned so that the sleeve roller 16 will not project beyond the inner surface of the side A1 of the body A.

I provide a cooperating roller F and FIGURE 4 shows this roller received in an opening 24 provided in the side A2 of the body A. The roller F rotates on a shaft 25 and this shaft has its ends received in aligned bores 26 provided in the sides A1.

FIGURE 5 shows the roller F spaced opposite from the sleeve roller 16 and the roller F contacts with the outer face 27 of the wallboard B. Again referring to FIGURE 4, it will be seen that the roller F has an enlarged cylindrical portion 28 that is concentric with the outer diameter of the roller and is designed to form a groove 29 in the outer surface 27 of the wallboard B, see FIGURE 7. The enlarged cylindrical portion 28 has a conical portion interconnecting it with the remainder of the roller F. The purpose for the groove 29 in the wallboard will be explained hereinafter.

I provide a handle G for the body A and this handle extends transversely with respect to the length of the body A. The top of the body A may have a transversely extending recess 30 for receiving the bottom of the central portion of the handle G, see FIGURE 2. Cap screws 31, see FIGURES 1 and 2, extend through the central portion of the handle G and are received in threaded bores 32 provided in the top of the body A. The handle has hand grip portions 33 that project beyond the sides of the body A and are inclined slightly downwardly at an angle as shown in FIGURES 3 and 4 so that the moment of force applied to the portions 33 will be in a plane that includes the roller portion 28 and the conical roller 18. The body A has a central opening 34 in the web portion 13 and this central opening communicates with the slot 1 and permits the operator to examine the work being done by the conical roller 18 and the enlarged portion 28 of the roller F on the wallboard B.

*Operation*

From the foregoing description of the various parts of the device, the operation thereof may be readily understood. The wallboard B has its edge 2 moved under the front wheel C of the tool and then the tool is moved along the edge so that sides A1 and A2 will straddle the sides of the wallboard. The operator swings the lever E from the inoperative position shown in FIGURE 5A, into operative position shown in FIGURES 1 to 5 inclusive. This will rotate the eccentric shaft portion 15a and move the sleeve roller 16 toward the slot 1 in the body A and cause the sleeve roller to contact with the inner wall 17 of the wallboard and cause the recess embossing roller F to force its enlarged cylindrical portion 28 into the outer surface 27 of the board to form the groove 29 adjacent to the edge 2. The length of the enlarged diameter portion 28 is less than the remaining length of the roller F as shown in FIGURE 4, so that the longer portion of the roller will roll on the surface of the wallboard and will determine the depth of the groove 29 formed by the portion 28.

The operator moves the tool back and forth along the edge 2 of the wallboard and the wheels C and D will ride on the edge and therefore cause the conical roller 18 to form the inclined portion 19 on the wallboard inner surface 18 and adjacent to the edge 2, and will cause the roller F to form the groove 29 on the outer surface of the wallboard and also adjacent to the edge 2. After the operator has moved the tool back and forth along the wallboard edge 2 and has finally moved the tool along the entire length of the edge 2, the wallboard will be provided with the inclined surface 19 and the groove 29 that will be coextensive with the length of the edge. The handle or lever E can now be swung into operative position to move the sleeve roller 16 away from the groove forming roller F. The tool can now be removed from the wallboard and it is ready for use on another wallboard section. The groove 29 formed in the wallboard will have a shoulder that makes an obtuse angle with the bottom of the groove as shown in FIGURE 7, rather than a right angle shoulder and this is due to the conical portion that interconnects the enlarged diameter portion 28 with the remainder of the roller F.

In FIGURE 6, I show a cross section through a metal stud H of the type shown in my copending application, Serial No. 292,996, filed July 5, 1963. The stud is composed of two identical halves H1, H2 and each half has two parallel channels 35 designed to receive the edges 2 of wallboard sections B. The partition thus formed if used as an outside partition could have the wallboard B received in one channel 35 and a piece of plywood or other hardwood received in the other channel 35 rather than a second piece of wallboard. The groove 29 formed in the outer surface 27 of the wallboard by my tool shown in FIGURES 1 to 5 inclusive, will receive an outer flange 36 of the stud half H1 or H2. At the same time the inclined portion 19 formed on the inner surface 17 of the wallboard will contact with an inclined portion 37 on the inner flange 38 of the channel 35. This inclined portion 37 will force the wallboard B outwardly as the edge 2 of the wallboard is moved into the channel 35 and this will cause the outer flange 36 to be received in the wallboard groove 29 and cause the outer face 27 of the wallboard to lie flush with the outer face of the outer flange 36. Each metal stud H will support two or four pieces of wallboard in the manner just described.

In FIGURES 8 and 9, I show a modified form of the invention. In this form the shaft 15 with its eccentric portion 15a and the actuating lever E are omitted. In place of this the body J is provided with a shaft 40 that is mounted in the side J1 and extends through an opening 41 that is provided in this side. The shaft 40 rotatably supports a sleeve roller 42 and this sleeve roller has a conical upper portion 42a.

FIGURE 9 is a transverse section taken along the line 9—9 of FIGURE 8 and this figure illustrates the shaft 40 mounted in aligned openings 43 provided in the body side J1 and communicating with the opening 41 in this side. The shaft 40 may be held in place in the side J1 in any manner desired. The sleeve roller 42 has its axis coinciding with the axis of the shaft 40. The sleeve roller 42 will contact with the inner surface 17 of the wallboard B as shown in FIGURE 9. The conical portion 42a of the sleeve roller will form the inclined portion 19 on the wallboard and adjacent to the edge 2 of the wallboard, see also FIGURE 7.

The other side J2 of the body J is similar to the side A2 of the body A. The side J2 has an opening 44, see FIGURE 9, for receiving a sleeve roller F1 that is similar to the sleeve roller F shown in FIGURE 4. A vertical shaft 45 extends through aligned openings in the side J2 and this shaft rotatably receives the sleeve roller F1. FIGURE 9 further shows the sleeve roller F1 provided with an enlarged cylindrical portion 46 that is similar to the enlarged cylindrical portion 28 on the sleeve roller F.

The sleeve roller F1 contacts with the outer surface 27 of the wallboard B and its enlarged cylindrical portion 46 forms the groove 29 in the wallboard and adjacent to the edge 2 as shown in FIGURE 7. In all other respects the body J of the modified form of my invention is the same as the body A shown in FIGURES 1 to 5A inclusive.

A further difference between the modified form of my invention shown in FIGURES 8 and 9 and the form shown in FIGURES 1 to 5a inclusive lies in the fact that the front and rear wheels C1 and D1, see FIGURE 8, have a flexible metal band K that is passed around these two wheels. The lower reach K1 of the endless band K rides on the edge 2 of the wallboard B, see FIGURE 8. In FIGURE 9 the lower reach K1 is indicated as passing under the interconnecting web 47 that lies between the sides J1 and J2 and forms the body J into an inverted U.

The wheels C1 and D1 of the modified form of my invention are mounted in front and rear brackets 48 and 49 and these are similar in shape to the brackets 4 and 9 illustrated in FIGURE 2. The body K has a transversely extending handle G1 that is similar to the handle G. Further description of the modified form of the invention is not necessary because in all other respects this form of the device is similar to the form shown in FIGURES 1 through 5A inclusive.

The operation of the modified form of the invention is somewhat the same as that described for the first form. The wallboard B is fed into the slot 50 formed by the spaced apart sides J1 and J2. The endless metal tread K that is mounted on the wheels C1 and D1, will ride on the edge 2 of the wallboard. The sleeve roller 42 will contact with the inner face 17 of the wallboard and will force the sleeve roller F1 against the outer face 27 of the wallboard and cause the enlarged cylindrical portion 46 of this sleeve roller to form the groove 29 in the wallboard. The conical portion 42a of the sleeve roller 32 will form the inclined portion 19 of the wallboard.

It is possible to construct the tool and omit the conical roller 18 in the first form of the device and do away with the conical portion 42a in the sleeve roller 42 in the second form of the device. The tool would not form the inclined portion 19 on the wallboard B with this change in tool design and only the groove 29 would be formed in the outer surface 27 of the wallboard.

The drawings show two forms of embossing tools for embossing the groove 29 in the wallboard B and adjacent to the edge 2. The embossing of the groove 29 might be accomplished by other types of embossing tools or by a method consisting of a series of steps or acts. The method would consist in the step of taking a sheet of wallboard and compressing one surface thereof adjacent to one edge and for a predetermined distance inwardly from the edge for forming a groove and for progressing along the length of the edge and continuing to progressively compress additional portions of the same wallboard surface adjacent to the same edge and inwardly for the same distance from the edge to form a continuous groove in the surface that extends parallel to the edge and throughout its entire length.

I claim:
1. An embossing tool for wallboard comprising:
 (a) a body U-shaped in cross section and having spaced apart parallel sides for receiving wallboard therebetween;
 (b) a groove-forming roller rotatably carried by one of said sides and being rollable over one surface and adjacent to an edge of the wallboard when the body is moved relative to the wallboard for embossing a groove in this surface that lies adjacent to the edge;
 (c) a shaft carried by the other side of said body and having its axis paralleling the axis of said groove-forming roller;
 (d) said shaft having an eccentric cylindrical portion;
 (e) a sleeve roller rotatably mounted on said eccentric portion; and
 (f) an arm having one end secured to said shaft; said arm being swingable for rocking said shaft and eccentric portion for causing the latter to move said sleeve roller transversely toward the wallboard surface lying adjacent thereto for moving the wallboard against said groove-forming roller and causing the latter to emboss the groove in the wallboard.

2. The combination as set forth in claim 1: and in which
   (a) a conical roller is mounted on said shaft; said conical roller contacting with the adjacent surface of the wallboard and being positioned to emboss an inclined surface portion on the wallboard and paralleling the wallboard edge, the inclined surface being disposed on the opposite face of the wallboard from that having the embossed groove formed therein.

3. An embossing tool for wallboard comprising:
   (a) a body U-shaped in cross section and having spaced apart parallel sides interconnected by a web for receiving wallboard therebetween;
   (b) a groove-forming roller rotatably carried by one of said sides and being rollable over one surface and adjacent to an edge of the wallboard when said body is moved relative to the wallboard, the axis of said roller being perpendicular to said web and parallel to said sides, said roller having a groove-forming cylindrical portion of greater diameter at the end disposed nearest to said web for pressing a groove into the wallboard surface adjacent to the edge thereof; the length of said cylindrical portion being less than the remaining length of said roller; and
   (c) a second roller rotatably carried by the other side of said body and being rollable over the other surface of the wallboard, said second roller having a length greater than the length of the groove-forming cylindrical portion of said first-mentioned roller and being disposed transversely across from and having its axis paralleling the axis of said first-mentioned roller;
   (d) whereby said second roller will cause the groove forming cylindrical portion of said first mentioned roller to form a groove in the wallboard adjacent to the wallboard edge as the embossing tool is moved with respect to the wallboard.

4. The combination as set forth in claim 3: and in which
   (a) the groove-forming cylindrical portion of said first mentioned roller having a conical portion interconnecting it with the remaining portion of said roller so that the groove formed in the wallboard will have a shoulder that makes an obtuse angle with the bottom of the groove.

5. The combination as set forth in claim 3: and in which
   (a) said second roller has a conical portion for forming an inclined portion in the wallboard surface contacted by the roller, this inclined wallboard portion being disposed on the opposite face of the wallboard that has the groove formed therein.

6. The combination as set forth in claim 3: and in which
   (a) a handle has its ends extending transversely from said body and being inclined downwardly from said web; whereby a line extending between the downwardly inclined handle ends will lie in a plane that includes both of said rollers so that the moment of force applied to these ends for moving the tool will also be applied to said body at a point where said rollers contact the wallboard surfaces.

7. An embossing tool for wallboard comprising:
   (a) a body U-shaped in cross section and having spaced apart parallel sides with a web therebetween for receiving a wallboard whose edge lies adjacent to the web;
   (b) a groove-forming roller rotatably carried by one of said sides and being rollable over one surface with its axis perpendicular to the plane of said web and having a groove-forming cylindrical portion of greater diameter and disposed adjacent to said web for pressing a groove into the wallboard and adjacent to its edge, the length of said cylindrical portion being less that the remaining length of said roller;
   (c) a second roller rotatably carried by the other side of said body and being rollable over the other surface of the wallboard, said second roller having a length greater than the length of the groove forming cylindrical portion of said first-mentioned roller and being disposed transversely across from and having its axis paralleling the axis of said first-mentioned roller; and
   (d) wheels carried by said body and riding on the edge of the wallboard for positioning said first roller so that its groove-forming portion will form a wallboard groove of the desired width, said wheels contacting with the wallboard edge at spaced distances on both sides from where said rollers contact with the wallboard for maintaining the roller axes perpendicular to a plane that is flush with the plane of the wallboard edge during the relative movement between the tool and the wallboard.

8. The combination as set forth in claim 7: and in which
   (a) an endless flexible tread is passed around the wheels and contacts with the portion of the wallboard edge that lies between the wheels.

References Cited by the Examiner

UNITED STATES PATENTS

| 1,776,046 | 9/1930 | Schmidt | 30—293 |
| 2,199,660 | 5/1940 | Eichhorn | 264—293 |
| 2,577,241 | 12/1951 | Gibson et al. | 264—293 |
| 2,635,491 | 4/1953 | Bell et al. | 72—101 |
| 2,654,276 | 10/1953 | Jones | 72—101 |
| 3,161,953 | 12/1964 | Theodorou | 30—202 |

WILLIAM FELDMAN, *Primary Examiner.*

JAMES. L. JONES, JR., *Assistant Examiner.*